US010354252B1

(12) United States Patent
Sahar et al.

(10) Patent No.: US 10,354,252 B1
(45) Date of Patent: Jul. 16, 2019

(54) LOCATION FEATURE GENERATION FOR USER AUTHENTICATION

(71) Applicant: EMC Corporation, Hopkinton, MA (US)

(72) Inventors: Carmit Sahar, Tel Aviv (IL); Eyal Kolman, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 537 days.

(21) Appl. No.: 15/083,911

(22) Filed: Mar. 29, 2016

(51) Int. Cl.
*G06Q 40/00* (2012.01)
*G06Q 20/40* (2012.01)

(52) U.S. Cl.
CPC ....... *G06Q 20/4016* (2013.01); *G06Q 20/405* (2013.01)

(58) Field of Classification Search
None
See application file for complete search history.

(56) References Cited

U.S. PATENT DOCUMENTS

| 9,781,130 B1 * | 10/2017 | Bailey | G06F 21/316 |
| 2014/0380422 A1 * | 12/2014 | Su | H04L 63/1433 726/4 |
| 2015/0278797 A1 | 10/2015 | Ratts et al. | |
| 2015/0310188 A1 * | 10/2015 | Ford | G06F 21/10 726/28 |
| 2015/0310434 A1 | 10/2015 | Cheung | |
| 2015/0365410 A1 | 12/2015 | Thompson | |
| 2016/0026779 A1 | 1/2016 | Grigg et al. | |

OTHER PUBLICATIONS

Hawker, T. et al., "Practical Queries of Massive N-Gram Database." Proceedings of Australasian language Technology Workshop, 2007 pp. 40-48.*

* cited by examiner

*Primary Examiner* — Olabode Akintola
(74) *Attorney, Agent, or Firm* — BainwoodHuang (57) ABSTRACT

Technology for providing risk-based authentication, in which a location N-gram is generated for each historical transaction, the location N-gram indicating both a location from which the historical transaction originated and at least one location from which at least one previous transaction performed by the user that performed the historical transaction originated. A counter corresponding to the location N-gram is identified and incremented in a behavior profile for the user. An anomalousness risk score for a current user transaction having the same location N-gram may be calculated based on a value of the counter. If the risk score exceeds a threshold, an alert may be issued or other action taken with regard to the current transaction. Techniques are provided that limit complexity resulting from using a series of locations to detect anomalous user behavior, and that reduce the sparseness of the generated historical behavior data.

20 Claims, 4 Drawing Sheets

LOCATION FEATURE GENERATION FOR USER AUTHENTICATION

BACKGROUND

Advanced risk-based authentication technologies apply data-driven risk assessment methods to detect deviations from regular user behavior. In some existing technologies, the regular behavior of a user and/or group of users is learned and kept up to date by continuously collecting historical behavior data regarding user activities. Historical behavior data is collected that describes characteristics of various specific types of user activities, such as logins, application accesses, and/or other user activities. Current user behavior is then compared to the historical behavior data. If the characteristics of a current user activity deviate sufficiently from the expected behavior indicated by the historical behavior data, a high risk score can be assigned to the activity.

Existing risk-based authentication technologies assess whether a current location from which a user activity originates is risky for a particular user by comparing the current location to the user's historical location data, and/or with historical location data for a group of users to which the user belongs. Using previous technologies, a specific risk score can be calculated based on how common the current user location is for the user and/or how common the current user location is for other members of the group to which the user belongs.

SUMMARY

Unfortunately, previous risk-based authentication technologies have only considered a user's current location when generating the risk score for an activity. Previous technologies have accordingly been unable to detect anomalous user behavior based on a user's movements between locations preceding a current activity. Additionally, using a series of user locations to detect anomalous user behavior has been impractical, since system complexity increases exponentially, and historical behavior data becomes more sparsely distributed, as the number of locations in the series increases. In the area of machine learning, this type of challenge is referred to as the "curse of dimensionality".

To address these and other shortcomings of previous technologies, a new technical solution is disclosed for providing risk-based authentication using location N-grams that each represent both a location from which a user transaction originated and one or more locations from which preceding transactions of the same user originated. In the disclosed technology, user activity data is received that describes one or more historical transactions performed by one or more users. In response to receipt of the user activity data, the disclosed technology generates historical behavior data by, for each one of the historical transactions described by the user activity data, generating a location N-gram that indicates both a location from which the historical transaction originated and at least one location from which at least one previous transaction originated that was performed by the same user that performed the historical transaction. The disclosed technology then identifies a counter corresponding to the generated location N-gram in a behavior profile for the user that performed the historical transaction, and increments the identified counter.

The disclosed technology also detects a current transaction performed by a user, and in response to detecting the current transaction, generates a location N-gram for the current transaction that indicates both a location from which the current transaction originated and at least one location from which at least one previous transaction originated that was performed by the same user that performed the current transaction. The disclosed technology identifies a counter corresponding to the generated location N-gram in a behavior profile for the user that performed the current transaction, and generates a risk score indicating anomalousness of the current transaction based on the value of the identified counter. Other behavior factors, such as group behavior factors, may also be used when generating the risk score indicating anomalousness of the current transaction. The risk score indicating anomalousness of the current transaction is then compared to a risk threshold, and an excessive risk response is triggered for the current transaction in response to the risk score exceeding the risk threshold. For example, in the case where the current transaction is a user login or other type of authentication request, the excessive risk response may include or consist of i) causing the user to perform a higher level of authentication, ii) denying the authentication request, blocking the user from being subsequently authenticated, iii) allowing the user to be authenticated and also generating an alert message to a security analyst to bring the user to the analyst's attention, or iv) allowing the user to be authenticated and monitoring the user's online activities for a subsequent time period and sending information collected during that time period to a security analyst. Otherwise, in response to the risk score indicating anomalousness of the current transaction not exceeding the risk threshold, the current transaction may simply be allowed to complete by allowing the user to be authenticated.

The disclosed technology may be embodied such that structural complexity is limited, and sparseness of data stored within the historical behavior data is reduced. In one example, each location N-gram is a "bi-gram" indicating a location from which the corresponding transaction originated and one location from which a previous transaction originated that was performed by the same user. A single "No Location Change" counter in the user's behavior profile may be used to count all location N-grams corresponding to historical transactions in which the location from which the corresponding historical transaction originated matches the location from which the previous transaction originated. Such location N-grams are generated for historical transactions performed from the same location as the location of the previous transaction performed by the same user. In such an example, for each location N-gram generated for a historical transaction, the disclosed system compares the locations indicated in the location N-gram to each other to determine whether they match. The disclosed system identifies and increments the "No Location Change" counter for each generated location N-gram in which the indicated locations match. Using this technique, the disclosed technology may be embodied to use a single counter to count all location N-grams that indicate a single location for both the location from which a historical transaction originated and the location from which the previous transaction of the same user originated, regardless of the specific location from which both the transactions originated.

In another example in which each location N-gram is a bi-gram indicating a location from which the corresponding transaction originated and one location from which a previous transaction performed by the same user originated, each user behavior profile includes a single counter for each unique alphabetically sorted combination of two different location indicators (e.g. country indicators). In such an example, generating historical behavior data includes, for each location N-gram generated for a historical transaction, alphabetically sorting location indicators contained in the location N-gram before identifying and incrementing the counter corresponding to the alphabetically sorted location N-gram in the behavior profile for the user that performed the transaction. Using this technique, for each unique combination of locations "A" and "B", the disclosed technology uses a single counter to count both i) those location N-grams "B:A" indicating a location "A" from which the historical transaction originated and a location "B" from which the previous transaction originated, and ii) those location N-grams "A:B" indicating a location "B" from which the historical transaction originated and a location "A" from which the previous transaction originated, thus reducing the number of counters in each user behavior profile required to count location N-grams by half.

In another example, each location N-gram is a "tri-gram" indicating the location from which the corresponding transaction originated and two locations from which previous transactions performed by the same user originated. The locations indicated by such a location N-grams are arranged as a first location, a second location, and a third location within the location N-gram. The counters for counting such location N-grams in a user's behavior profile may consist of only five counters: i) a counter for counting all location N-grams in which all three transaction locations match, ii) a counter for counting all location N-grams in which only the first and second transaction locations match, iii) a counter for counting all location N-grams in which only the second and third transaction locations match, iv) a counter for counting all location N-grams in which only the first and third transaction locations match, and v) a counter for counting all location N-grams in which none of the transaction locations match. In such an example, generating historical behavior data includes, for each location N-gram generated for a historical transaction, comparing locations indicated within the generated location N-gram to each other to determine which locations match, and i) identifying and incrementing the single counter for counting all location N-grams in which all three locations match in response to determining that all three locations indicated in the generated location N-gram match,
  ii) identifying and incrementing the single counter for counting all location N-grams in which only the first and second locations match in response to determining that only the first location and second location indicated in the generated location N-gram match,
  iii) identifying and incrementing the single counter for counting all location N-grams in which only the second and third locations match in response to determining that only the second location and third location indicated in the generated location N-gram match,
  iv) identifying and incrementing the single counter for counting all location N-grams in which only the first and third locations match in response to determining that only the first location and third location indicated within the generated location N-gram match, and
  v) identifying and incrementing the single counter for counting all location N-grams in which none of the locations match in response to determining that none of the locations indicated within the generated location N-gram match.

Using the above described technique, the disclosed technology may be embodied to use only five counters to count location tri-grams indicating three transaction locations, e.g. a location from which a historical transaction originated and two locations from which previous transactions performed by the same user originated.

In another example in which each location N-gram generated for a transaction is a "tri-gram" indicating a location from which the corresponding transaction originated and two locations from which previous transactions performed by the same user originated, also with the location indications arranged as a first location, a second location, and a third location within the location N-gram, the counters used to count location N-grams may also reflect the combined individual risk scores for the locations indicated in each location N-gram. In such an example, the counters in the behavior profile for the user may include i) a first set of counters corresponding to location N-grams in which all three transaction locations in the location N-gram match, with each counter in the first set of counters also corresponding to one of the values in a set of discrete combined risk values, ii) a second set of counters corresponding to location N-grams in which only the first and second transaction locations in the location N-gram match, with each counter in the second set of counters also corresponding to one of the values in the set of discrete combined risk values, iii) a third set of counters corresponding to location N-grams in which only the second and third locations in the location N-gram match, with each counter in the third set of counters also corresponding to one of the values in the set of discrete combined risk values, iv) a fourth set of counters corresponding to location N-grams in which only the first and third locations in the location N-gram match, with each counter in the fourth set of counters also corresponding to one of the values in the set of discrete combined values, and v) a fifth set of counters corresponding to location N-grams in which none of the locations in the location N-gram match, with each counter in the fifth set of counters also corresponding to one of the values in the set of discrete combined risk values. In such an example, identifying a counter corresponding to the location N-gram generated for a historical transaction includes i) calculating a combined risk value by combining the individual location risk values for the three individual locations indicated by the N-gram, ii) generating a discretized combined risk value by mapping the combined risk value to a corresponding one of the values in the set of discrete combined risk values, and iii) identifying a counter contained in the set of counters within the behavior profile for the user that performed the transaction corresponding to both a) the location N-gram generated for the historical transaction and b) the discretized combined risk value generated for the location N-gram.

Using the above technique, the disclosed technology may be embodied to use only a number of counters equal to five times the number of values in the set of discrete combined risk values to count location N-grams that are "tri-grams" indicating three locations, e.g. a location from which a historical transaction originated and two locations from which previous transactions were originated by the same user.

Embodiments of the disclosed technology may solve significant problems inherent in previous technologies. Specifically, the disclosed technology enables detection of anomalous user behavior based on one or more user locations preceding a current activity. Additionally, embodiments of the disclosed system enable detection of anomalous user behavior using multiple transaction locations for a user without creating an impractical degree of complexity, and without causing the historical behavior data to become too sparsely distributed. The disclosed technology advantageously generates an informative and accurate user behavior profile that provides accurate risk estimation. As a result, potentially higher fraud detection rates and lower false alarms rates may be obtained.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
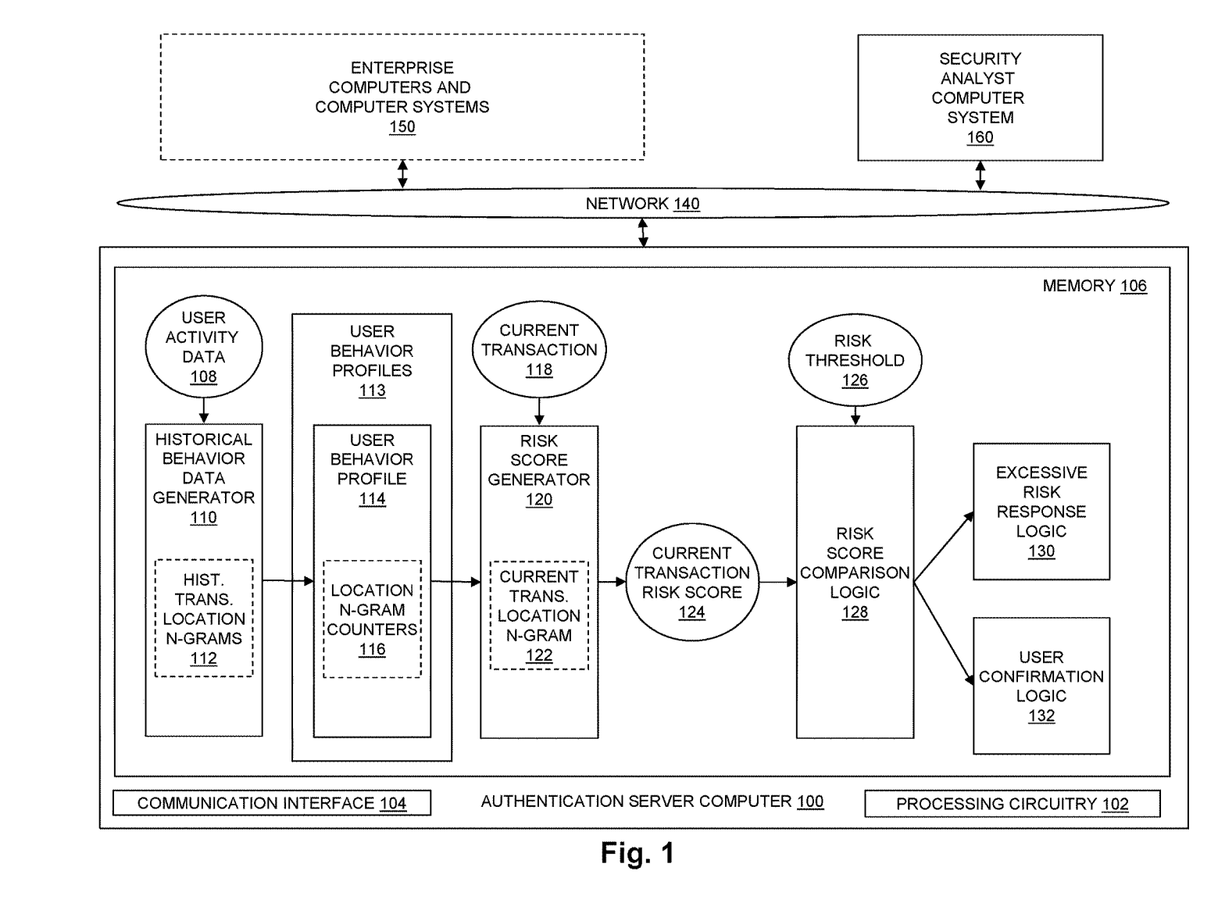
FIG. 1 is a block diagram showing an example of components in an illustrative embodiment of the disclosed system while operating to provide risk-based authentication using location N-grams that each represent both a location from which a user transaction originated and one or more locations from which previous transactions performed by the same user originated.

FIG. 1 is a block diagram showing an example of components in an illustrative embodiment of the disclosed system while operating to provide risk-based authentication using location N-grams that represent both a location from which a user transaction originated and one or more locations from which one or more previous transactions performed by the same user originated. As shown in FIG. 1, an Authentication Server Computer 100 includes Processing Circuitry 102, Communication Interface 104, and Memory 106. Processing Circuitry 102 may, for example, include or consist of one or more microprocessors or the like. Communication Interface 104 may, for example, include or consist of one or more network interface cards (NICs) or the like. Memory 106 may include or consist of any specific type of volatile or non-volatile semiconductor memory or the like that is operable to store programs (e.g. sequences of instructions) for execution by Processing Circuitry 102, and/or data (e.g. program state information, input data, output data, etc.) for use by the programs executing in the Authentication Server Computer 100.

Authentication Server Computer 100 may consist of or include any specific type of server computer or server computer system, including but not limited to one or more devices such as rack-mount servers, blade servers, and/or desktop computer systems, and may include multiple such devices arranged into one or more computing clusters.

The Memory 106 of Authentication Server Computer 100 stores program code for execution by the Processing Circuitry 102, shown for purposes of illustration in the example of FIG. 1 as including Historical Behavior Data Generator 110, Risk Score Generator 120, Risk Score Comparison Logic 128, Excessive Risk Response Logic 130, and User Confirmation Logic 132.

In addition, those skilled in the art will further recognize that while only certain examples of program code are shown in FIG. 1 for purposes of concise illustration and explanation, other specific program code or logic may also be present in Memory 106. Such additional software may, for example, include operating system, middleware, and/or various specific types of application program code.

Authentication Server Computer 100 may be communicably interconnected to Enterprise Computers and Computer Systems 150 and Security Analyst Computer System 160 by a Network 120. Network 120 may be made up of one or more communication networks and/or computer networks that allow computers to exchange data. Such networks may, for example, include or consist of one or more Local Area Networks (LANs), Wireless Local Area Networks (WLANs), Wide Area Networks (WANs), e.g. the Internet, and/or any other specific type of network. Messages communicated over Network 120 may be embodied and exchanged based on one or more communication protocols including, but not limited to, Hypertext Transfer Protocol (HTTP), Transmission Control Protocol (TCP), Internet Protocol (IP), Ethernet, Wi-Fi, and/or any other specific communication protocol that may be appropriate for a particular network or embodiment.

Enterprise Computers and Computer Systems 150 may, for example, include or consist of various specific types of computers and computer systems associated with a specific corporation, government agency, or other type of enterprise. Enterprise Computers and Computer Systems 150 may include servers and user computers through which users access various specific enterprise systems that are owned and/or controlled by the enterprise. Such enterprise systems may, for example, include enterprise communication systems, databases, collaboration software and other applications, etc., and may provide access to or use confidential or proprietary information or resources. Users of computers in Enterprise Computers and Computer Systems 150 may be enterprise employees or the like that perform various specific types of transactions that access enterprise systems provided in Enterprise Computers and Computer Systems 150. One example of a transaction is a user logging in to an enterprise system by providing their username and password. Transactions that access enterprise systems, such as user logins, may be performed by users from various different geographic locations, and accordingly different transactions performed by the same user may originate from such different geographic locations.

Security Analyst Computer System 160 may consist of or include one or more computers associated with or used by one or more security analyst users who are responsible for maintaining the security of the enterprise systems provided in Enterprise Computers and Computer Systems 150. For example, Security Analyst Computer System 160 may include a graphical user interface through which alerts can be displayed to a security analyst, and the alerts may display the identities of one or more suspicious users to the security analyst. Such a graphical user interface of Security Analyst Computer System 160 may also display information describing activities performed by one or more suspicious users to the security analyst, such as information regarding login or other types of activities performed by suspicious users.

During operation of the components shown in FIG. 1, Historical Behavior Data Generator 100 receives User Activity Data 108. User Activity Data 108 may be received by Authentication Server Computer 100 from one or more systems within Enterprise Computers and Computer Systems 150. For example, User Activity Data 108 may be a report or transaction log describing transactions (e.g. logins) performed by one or more users with regard to one or more enterprise systems during a preceding time period. The transactions described by the User Activity Data 108 are referred to herein as "historical" transactions. In one example, User Activity Data 108 includes an entry or other descriptor for each transaction performed during the preceding time period. Each entry identifies the user that performed the corresponding transaction, and may include other information regarding the transaction such as an IP (Internet Protocol) address of the device used to perform the transaction, and a time stamp indicating the time of the transaction. Each entry may further include an express indication of the geographic location from which the corresponding transaction originated. The entries in the User Activity Data 108 may also, or alternatively, be ordered based on the times of the historical transactions they describe, e.g. such that the entries are ordered within User Activity Data 108 from oldest to most recent corresponding historical transaction.

In response to receipt of User Activity Data 108, Historical Behavior Data Generator 110 generates historical behavior data based on the historical transactions described in User Activity Data 108. Specifically, for each one of the historical transactions described in User Activity Data 108, Historical Behavior Data Generator 110 generates a location N-gram for the historical transaction that indicates both i) a location from which the historical transaction originated, and ii) at least one location from which originated at least one previous transaction performed by the same user that performed the historical transaction. For example, in one embodiment, in the case of a historical transaction that originated in the United States, and where the previous transaction performed by the same user that performed the historical transaction originated from the United Kingdom, the location N-gram generated by Historical Behavior Data Generator 110 would be "UK:US".

Historical Behavior Data Generator 110 may identify one or more previous transactions performed by the same user that performed a historical transaction using time stamps indicating the times of the historical transactions described in User Activity Data 108. Alternatively, Historical Behavior Data Generator 110 may identify one or more previous transactions performed by the same user that performed the historical transaction based on the order of the entries in User Activity Data 108, in the case where the entries in User Activity Data 108 are ordered based on the times at which the corresponding historical transactions were performed.

Historical Behavior Data Generator 110 may use geolocation software to determine the locations from which the historical transaction and one or more previous transactions performed by the same user originated based on IP addresses of the device or devices used to perform the historical transaction and preceding transaction or transactions. Alternatively, Historical Behavior Data Generator 110 may determine the locations from which the historical transaction and one or more previous transactions performed by the same user originated using express indications contained in User Activity Data 108 of the geographic locations from which the historical transaction and the previous transaction or transactions originated.

For purposes of illustration, the one or more location N-grams generated by Historical Behavior Data Generator 110 corresponding to historical transactions described in User Activity Data 108 are shown in FIG. 1 by Historical Transaction Location N-grams 112.

Further while generating historical behavior data for each one of the historical transactions described in User Activity Data 108, Historical Behavior Data Generator 110 identifies and increments a counter for each one of the location N-grams in Historical Transaction Location N-grams 112. Each one of the location N-grams generated in Historical Transaction Location N-grams 112 causes Historical Behavior Data Generator 110 to identify and increment a corresponding location N-gram counter in a user behavior profile of the user that performed the historical transaction from which the location N-gram was generated. For example, for one or more of the Historical Transaction Location N-grams 112 generated for historical transactions performed by a user associated with User Behavior Profile 114, Historical Behavior Data Generator 110 identifies and increments one of the counters in Location N-gram Counters 116. For example, for each of Historical Transaction Location N-grams 112 equal to "UK:US", and generated for historical transactions performed by the user associated with User Behavior Profile 114, Historical Behavior Data Generator 110 identifies and increments a counter within Location N-gram Counters 116 that counts all location N-grams equal to "UK:US" generated for historical transactions performed by the user associated with User Behavior Profile 114. User Behavior Profile 114 is an example of multiple user behavior profiles, shown by User Behavior Profiles 113. Each individual user behavior profile in User Behavior Profiles 113 is used to store historical behavior data for a different user, and includes location N-gram counters for counting location N-grams generated for corresponding historical transactions performed by that user.

Further during operation of the embodiment shown in FIG. 1, Risk Score Generator 120 detects a Current Transaction 118 performed by a user. Current Transaction 118 may be a user login or other type of request to access an enterprise system in Enterprise Computers and Computer Systems 150 that requires user authentication. For example and for purposes of concise illustration and explanation, Risk Score Generator 120 may detect that Current Transaction 118 was performed by the same user whose historical behavior is represented by User Behavior Profile 114. In response to detecting Current Transaction 118, Risk Score Generator 120 generates a location N-gram for Current Transaction 118 that indicates both a location from which Current Transaction 118 originated, and at least one location from which at least one previous transaction originated that was performed by the same user that performed Current Transaction 118. For example, in one embodiment, in the case where Current Transaction 118 originated in the United States, and where the previous transaction performed by the same user that performed the Current Transaction 118 originated from the United Kingdom, the location N-gram generated by Risk Score Generator 120 would be "UK:US".

In the example of FIG. 1, the location N-gram generated by Risk Score Generator 120 for Current Transaction 118 is shown for purposes of illustration by Current Transaction Location N-gram 122.

Risk Score Generator 120 may, for example, retrieve information describing the origins of one or more previous transactions performed by the same user that performed Current Transaction 118 from internally maintained state information describing previous transactions (e.g. logins) performed by multiple users and previously processed by Risk Score Generator 120 while controlling access to one or more enterprise systems in Enterprise Computers and Computer Systems 150.

Risk Score Generator 120 may also, for example, use geolocation software to determine the locations from which Current Transaction 118 and one or more previous transactions performed by the same user originated, based on IP addresses of the device or devices used to perform Current Transaction 118 and the previous transactions. Alternatively, Risk Score Generator 120 may determine the locations from which Current Transaction 118 and such previous transactions originated from express geographic location indications contained in Current Transaction 118, and/or stored in association with information describing previously processed transactions.

Risk Score Generator 120 identifies a counter corresponding to Current Transaction Location N-gram 122 in the location N-gram counters contained in the user behavior profile for the user that performed Current Transaction 118. For example, in the case where the user that performed Current Transaction 118 is the user associated with User Behavior Profile 114, Risk Score Generator identifies a counter corresponding to Current Transaction Location N-gram 122 in Location N-gram Counters 116. For example, in the case where Current Transaction Location N-gram 122 is equal to "UK:US", and where the user that performed Current Transaction 118 is the user associated with User Behavior Profile 114, Risk Score Generator 120 identifies a counter within Location N-gram Counters 116 that counts all location N-grams equal to "UK:US" generated for historical transactions performed by the user associated with User Behavior Profile 114.

Risk Score Generator 120 then generates a risk score based on the counter corresponding to Current Transaction Location N-gram 122, shown by Current Transaction Risk Score 124. Current Transaction Risk Score 124 indicates how anomalous Current Transaction Location N-gram 122 is with respect to previous user behavior, including at least the previous behavior of the user who performed Current Transaction 118. For example, Current Transaction Risk Score 124 indicates the level of "anomalousness" of Current Transaction Risk Score 124 with respect to previous behavior of the user who performed Current Transaction 118, based at least in part on the number of location N-grams generated for historical transactions performed by that user that match Current Transaction Location N-gram 122.

In one example, Current Transaction Risk Score 124 may be inversely proportionate to the ratio between the value of the counter corresponding to Current Transaction Location N-gram 122 and the total number of transactions previously performed by the user that performed Current Transaction 118. For example, Current Transaction Risk Score 124 may be a value ranging between 0 and 100, and be set to 100 minus a percentage equal to the ratio between i) the current value of the counter corresponding to Current Transaction Location N-gram 122, and ii) a total number of transactions previously performed by the user that performed Current Transaction 118. In other words, Current Transaction Risk Score 124 may be equal to 100 minus the percentage of all previous transactions performed by the user that performed Current Transaction 118 that had location N-grams that were the same as Current Transaction Location N-gram 122. The total number of previous transactions performed by the user associated with User Behavior Profile 116 may, for example, be calculated as the sum of all counters in Location N-gram Counters 116.

Other specific risk score ranges may alternatively be used, and other user behavior factors, including group behavior factors reflecting the relative frequency of Current Transaction Location N-gram 122 in location N-grams generated for previous transactions performed by users in a group of users that includes the user that performed Current Transaction 118, may also or alternatively be used when generating Current Transaction Risk Score 124.

Risk Score Comparison Logic 128 then compares Current Transaction Risk Score 124 to a risk threshold, shown in FIG. 1 by Risk Threshold 126. If Risk Score Comparison Logic 128 determines that Current Transaction Risk Score 124 exceeds Risk Threshold 126, Risk Score Comparison Logic 128 triggers Excessive Risk Response Logic 130. Excessive Risk Response Logic 130 may operate to perform an action including or consisting of:
  i) causing the user that performed Current Transaction 118 to complete a higher level of authentication, such as answering one or more questions from a human security analyst over the phone, via SMS, etc.
  ii) denying the Current Transaction 118 and also blocking the user that performed Current Transaction 118 from being subsequently authenticated,
  iii) allowing the user that performed Current Transaction 118 to be authenticated and also transmitting an alert message with the user's identity to Security Analyst Computer System 160 to bring the user to the attention of a security analyst, or
  iv) allowing the user that performed Current Transaction 118 to be authenticated and monitoring the user's subsequent online activities for a subsequent time period and transmitting information collected during that time period to Security Analyst Computer System 160 for review by a security analyst.

Otherwise, in response to Current Transaction Risk Score 124 not exceeding the Risk Threshold 126, Risk Score Comparison Logic 128 triggers User Confirmation Logic 132, which allows Current Transaction 118, such that the user that performed Current Transaction 118 is successfully authenticated and allowed to access an enterprise system in Enterprise Computers and Computer Systems 150.

Each of the location N-grams of the disclosed system (e.g. Historical Transaction Location N-grams 112, or Current Transaction Location N-gram 122) indicates both a location from which a corresponding transaction (e.g. one of the historical transactions described in User Activity Data 108, or Current Transaction 118) originated, and a location or locations from which originated one or more previous transactions performed by the same user that performed the transaction corresponding to the N-gram. For a given location N-gram, the one or more previous transactions performed by the same user that performed the transaction corresponding to the N-gram consist of the last one or more transactions performed by the user before the transaction corresponding to the N-gram. In other words, the locations indicated by a given location N-gram are locations from which originated two or more sequential transactions performed by a single user.

In one embodiment, each location N-gram is a "bi-gram" indicating a location from which the corresponding transaction originated and one location from which originated a previous transaction performed by the same user that performed the corresponding transaction. In such an embodiment, for a transaction that originated in location "A", if the location from which the previous transaction performed by the same user originated is location "B", the disclosed system generates a location N-gram of "B:A".

In other embodiments, each location N-gram is a "tri-gram" indicating a location from which the corresponding transaction originated and the locations from which originated two previous transactions performed by the same user that performed the corresponding transaction. In such embodiments, for a transaction that originated in location "A", if the location from which the preceding transaction performed by the same user originated is location "B", and if the transaction performed by the same user that preceded the transaction that originated from location "B" originated from a location "C", the disclosed system generates a location N-gram of "C:B:A".

Thus the location indications in a location N-gram generated by the disclosed system may, for example, at least initially be ordered from oldest to most recent transaction. As further described below, some embodiments may rearrange the location indications within each location N-gram (e.g. into alphabetical order), before identifying and incrementing a counter corresponding to the location N-gram.

The locations indicated within each location N-gram generated by the disclosed system may be any specific type of geographic location. In one embodiment, the locations indicated within each location N-gram are individual countries. Alternatively, the disclosed system may be embodied such that the locations indicated within each location N-gram are more finely grained locations, such as individual states in the USA, individual cities, or individual counties. In another alternative, the disclosed system may be embodied such that locations indicated within each location N-gram are more coarsely grained locations, such as multi-country geographic regions.

In the case where the locations indicated within each location N-gram are countries, each location may be indicated using a two letter country code, for example one of the two letter country codes supplied by ISO (International Organization for Standardization).

Figure 2:
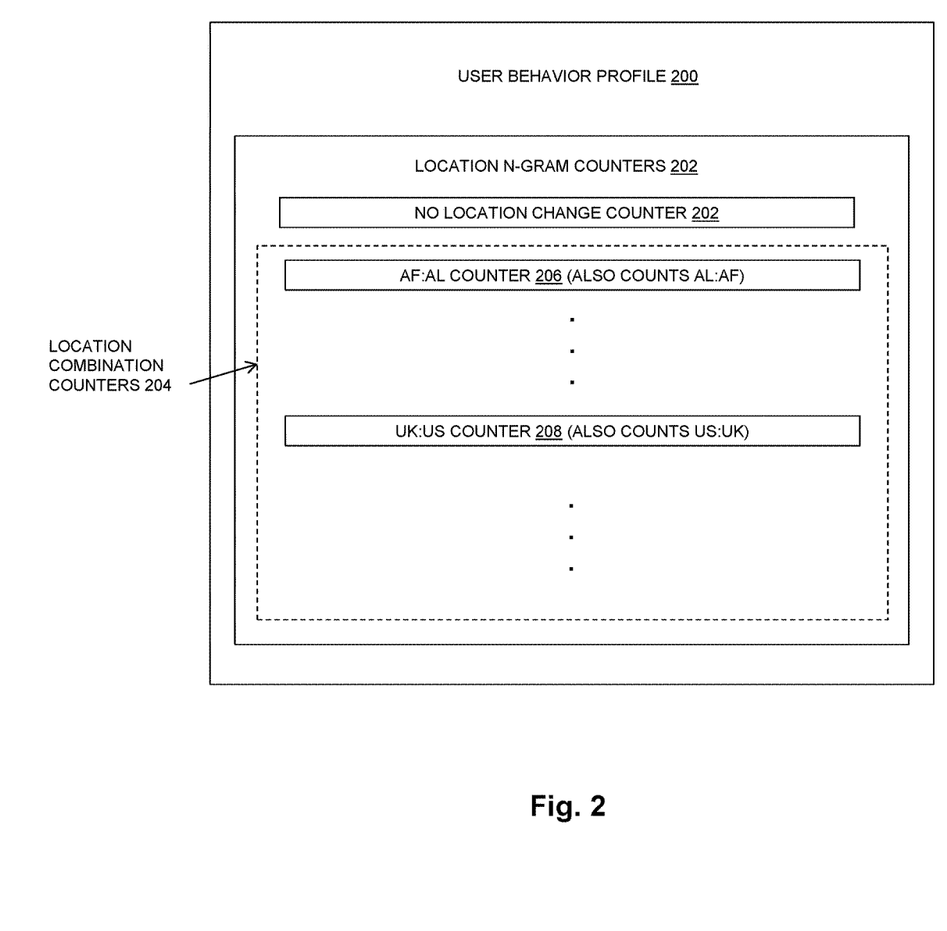
FIG. 2 is a block diagram showing an example of a user behavior profile containing counters for counting N-grams in an embodiment in which the N-grams are "bi-grams"

The disclosed technology may be embodied such that structural complexity is limited, and sparseness of data stored within the historical behavior data is reduced. In some embodiments, additionally illustrated in FIG. 2, each location N-gram is a "bi-gram" indicating a location from which the corresponding transaction originated and one location from which a previous transaction originated that was performed by the same user. In one such embodiment, each one of User Behavior Profiles 113 has the format of User Behavior Profile 200. User Behavior Profile 200 illustrates an example of location N-gram counters that may be used in user behavior profiles in an embodiment in which each location N-gram is a "bi-gram". As shown in FIG. 2, User Behavior Profile 200 contains a single No Location Change Counter 202 that is used by Historical Behavior Data Generator 110 to count all location N-grams corresponding to historical transactions performed by the user associated with User Behavior Profile 200 in which the location from which the corresponding historical transaction originated matches the location from which the previous transaction originated. Such location N-grams may be generated by Historical Behavior Data Generator 110 for all historical transactions that originate from the same location as the location from which the previous transaction performed by the same user originated. In such an embodiment, for each location N-gram generated by Historical Behavior Data Generator 10 for a historical transaction described in User Activity Data 108, Historical Behavior Data Generator 110 compares the locations indicated in the location N-gram to each other to determine whether they match. Historical Behavior Data Generator 110 then identifies and increments No Location Change Counter 202 for each location N-gram generated for a historical transaction performed by the user associated with User Behavior Profile 200 in which the indicated locations match. Advantageously, the embodiment illustrated in FIG. 2 uses a single counter (e.g. No Location Change Counter 202) to count all of the location N-grams generated for historical transactions performed by a user that indicate a single location for both the location from which the historical transaction originated and from which a previous transaction performed by that user originated, regardless of the specific location from which the transactions originated. For example, in an embodiment in which locations are countries indicated by two letter country codes, location N-grams such as US:US, UK:UK, IS:IS and the like generated by Historical Behavior Data Generator for historical transactions performed by the user associated with User Behavior Profile 200 would all cause Historical Behavior Data Generator 110 to identify and increment No Location Change Counter 202. Similarly, in the case where Current Transaction 118 is performed by the user associated with User Behavior Profile 200, Risk Score Generator 120 would operate to determine Current Transaction Risk Score 124 based on the value of No Location Change Counter 202 in response to determining that the locations indicated by Current Transaction Location N-gram match.

FIG. 2 also illustrates how, in an embodiment of the disclosed system in which each location N-gram is a bi-gram, and in which each one of User Behavior Profiles 113 has the format of User Behavior Profile 200, each user behavior profile may include a single counter for counting each unique alphabetically sorted combination of two different location indicators (e.g. country indicators). In the example of FIG. 2, counters for counting unique alphabetically sorted combinations of different location indicators are shown by Location Combination Counters 204. In an embodiment in which each one of User Behavior Profiles 113 has the format of the User Behavior Profile 200 shown in FIG. 2, for each location N-gram generated for a historical transaction (e.g. for each of Historical Transaction Location N-grams 112), in the case where the location indicators in the location N-gram do not match, Historical Behavior Data Generator 110 alphabetically sorts the location indicators contained in the location N-gram before identifying and incrementing the counter corresponding to the location N-gram in the behavior profile for the user that performed the transaction. Accordingly, for each pair of different location indicators, e.g. for location indicators "A" and "B", User Behavior Profile 200 uses a single counter to count both i) those location N-grams "B:A" indicating a location "A" from which the historical transaction originated and a location "B" from which the previous transaction originated, and ii) those location N-grams "A:B" indicating a location "B" from which the historical transaction originated and a location "A" from which the previous transaction originated, thus reducing the number of counters required to count location N-grams in User Behavior Profile 200 by half.

In the specific example of User Behavior Profile 200 shown in FIG. 2, in which two letter country codes are used as location indicators, an example of a counter in Location Combination Counters 204 is shown as AF:AL Counter 206, which is used to count location N-grams equal to AF:AL, each of which corresponds to a transaction originating from Albania (AL) with a previous transaction originating in Afghanistan (AF), and also to count AL:AF location N-grams, each of which corresponds to a transaction originating from Afghanistan (AF) with a previous transaction originating in Albania (AL), since the alphabetical sorting performed by Historical Behavior Data Generator 110 prior to counter identification and incrementing causes the AL:AF location N-grams to be converted into AF:AL location N-grams. The Location Combination Counters 204 include a counter for each of the other unique alphabetically sorted combinations of different country codes alphabetically following AF:AL Counter 206, one example of which, shown for purposes of illustration and further explanation is UK:US Counter 208. UK:US Counter 208 is used to count location N-grams equal to UK:US, each of which corresponds to a transaction originating from the United States (US) with a previous transaction originating in the United Kingdom (UK), and also to count US:UK location N-grams, each of which corresponds to a transaction originating from the United Kingdom (UK) with a previous transaction originating in the United States (US), since the alphabetical sorting performed by Historical Behavior Data Generator 110 prior to counter identification and incrementing causes the US:UK location N-grams to be converted into UK:US location N-grams.

Similarly, in an embodiment in which each one of the User Behavior Profiles 113 has the format of the User Behavior Profile 200 shown in FIG. 2, Risk Score Generator 120 determines a specific user behavior profile associated with the user that performed Current Transaction 118, and in the case where the location indicators in Current Transaction Location N-gram 122 do not match, alphabetically sorts the location indicators in Current Transaction Location N-gram 122, identifies a counter in Location Combination Counters 204 that corresponds to the alphabetically sorted Current Transaction Location N-gram 122, and determines Current Transaction Risk Score 124 using the value of the counter in Location Combination Counters 204 identified using the alphabetically sorted Current Transaction N-gram 122.

Figure 3:
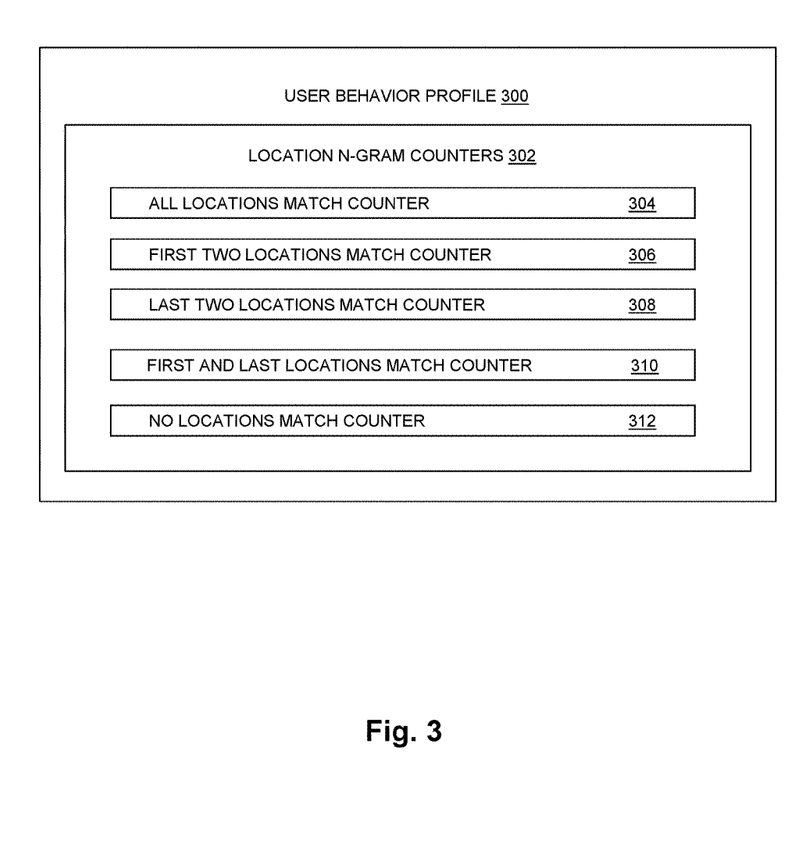
FIG. 3 is a block diagram showing an example of a user behavior profile containing counters for counting N-grams in a first embodiment in which the N-grams are "tri-grams"

In some other embodiments, each location N-gram is a "tri-gram" indicating both the location from which the corresponding transaction originated and two locations from which previous transactions performed by the same user originated. The locations indicated by such tri-grams may be arranged within each tri-gram as a first location, a second location, and a third location. FIG. 3 is a block diagram showing an example of a user behavior profile containing counters for counting location N-grams in an illustrative embodiment in which the location N-grams are "tri-grams". In the embodiment of FIG. 3, each one of the User Behavior Profiles 113 has a format like the format shown in User Behavior Profile 300. As shown in FIG. 3, the Location N-gram Counters 302 are used to count location N-grams corresponding to historical transactions performed by a user associated with User Behavior Profile 300, and consist of only five counters: i) an All Locations Match Counter 304 for counting all location N-grams in which all three transaction locations match, ii) a First Two Locations Match Counter 306 for counting all location N-grams in which only the first and second transaction locations match, iii) a Last Two Locations Match Counter 308 for counting all location N-grams in which only the second and third transaction locations match, iv) a First and Last Locations Match Counter 310 for counting all location N-grams in which only the first and third transaction locations match, and v) a No Locations Match Counter 312 for counting all location N-grams in which none of the transaction locations match. In an embodiment in which each of User Behavior Profiles 113 has the format of User Behavior Profile 300, the Historical Behavior Data Generator generates historical behavior data by, for each location N-gram generated for a historical transaction performed by a given user (e.g. for one or more of Historical Transaction Location N-grams 112), comparing locations indicated within the generated location N-gram to each other to determine which locations match, and, within the user behavior profile associated with that user, i) identifying and incrementing the All Locations Match Counter 304 in response to determining that all three locations indicated in the generated location N-gram match,
  ii) identifying and incrementing the First Two Locations Match Counter 306 in response to determining that only the first location and second location indicated in the generated location N-gram match,
  iii) identifying and incrementing the Last Two Locations Match Counter 308 in response to determining that only the second location and third location indicated in the generated location N-gram match,
  iv) identifying and incrementing the First and Last Locations Match Counter 310 in response to determining that only the first location and third location indicated within the generated location N-gram match, and
  v) identifying and incrementing the No Locations Match Counter 312 in response to determining that none of the locations indicated within the generated location N-gram match.

For example, All Locations Match Counter 304 would be identified and incremented for a location N-gram of US:US: US, First Two Locations Match Counter 306 would be identified and incremented for a location N-gram of US:US: UK, Last Two Locations Match Counter 308 would be identified and incremented for a location N-gram of US:UK: UK, First and Last Locations Match Counter 310 would be identified and incremented for a location N-gram of US:UK: US, and No Locations Match Counter 312 would be identified and incremented for a location N-gram of US:UK:IS.

Similarly, also in an embodiment in which each of the User Behavior Profiles 113 have the format of the User Behavior Profile 300 shown in FIG. 3, Risk Score Generator 120 determines the specific user behavior profile associated with the user that performed Current Transaction 118, and identifies a counter in that user behavior profile that corresponds to Current Location Transaction N-gram 122 using the same steps described above with regard to identifying and incrementing a counter in Location N-Gram Counters 302 for one of the Historical Transaction Location N-grams 112, and then determines Current Transaction Risk Score 124 using the value of that counter.

Using the techniques described above with reference to the User Behavior Profile 300 shown in FIG. 3, the disclosed technology may be embodied to use only five counters per user behavior profile to count each location tri-grams generated for each user, where each tri-gram indicates three transaction locations, e.g. a location from which a historical transaction originated and two locations from which previous transactions performed by the same user originated.

Figure 4:
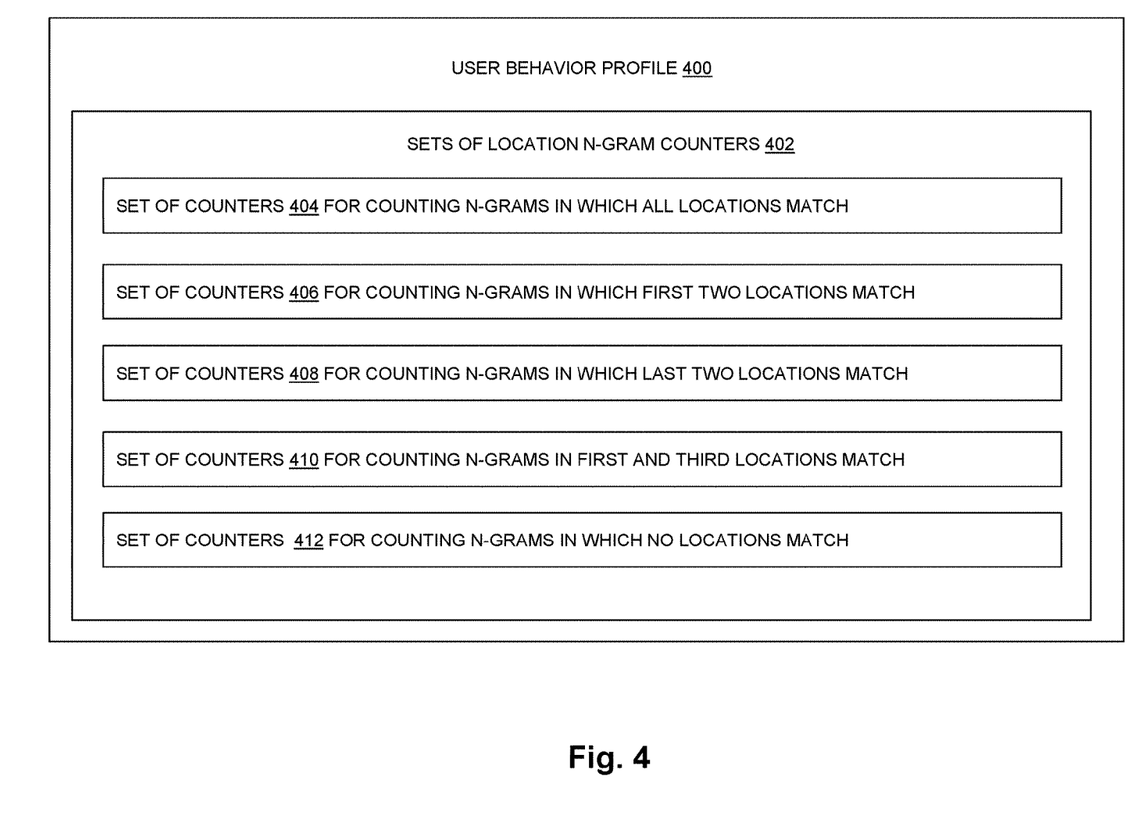
FIG. 4 is a block diagram showing an example of a user behavior profile containing counters for counting N-grams in a second embodiment in which the N-grams are "tri-grams".

FIG. 4 is a block diagram showing an example of Location N-gram Counters 402 in a User Behavior Profile 400 for counting N-grams in another embodiment, in which the N-grams are also "tri-grams", and in which the counters used to count location N-grams also reflect the combined individual risk scores for the locations indicated in each location N-gram. In the embodiment of FIG. 4, each of the User Behavior Profiles 113 has a format like the format of User Behavior Profile 400. The Sets of Location N-gram Counters 402 are used to count location N-grams corresponding to historical transactions performed by a user associated with User Behavior Profile 400, with each counter in a given set of counters used to count location N-grams with a discretized combined risk score equal to a corresponding value in a set of discrete combined risk score values.

As shown in FIG. 4, Sets of Location N-gram Counters 402 includes a Set of Counters 404 for counting location N-grams in which all three locations match, a Set of Counters 406 for counting location N-grams in which only the first two locations match, a Set of Counters 408 for counting location N-grams in which only the last two locations match, a Set of Counters 410 for counting location N-grams in which only the first and third locations match, and a Set of Counters 412 for counting location N-grams in which none of the locations match.

In the embodiment of FIG. 4, the disclosed system selects a set of counters corresponding to a location N-gram based on which locations indicated in the location N-gram match. For example, for a location N-gram in which all locations match (e.g. US:US:US), the embodiment of the disclosed system shown in FIG. 4 selects Set of Counters 404 as the corresponding set of counters. For a location N-gram in which only the first two locations match (e.g. US:US:UK), the embodiment of the disclosed system shown in FIG. 4 selects Set of Counters 406 as the corresponding set of counters. For a location N-gram in which only the last two locations match (e.g. US:UK:UK), the embodiment of the disclosed system shown in FIG. 4 selects Set of Counters 408 as the corresponding set of counters. For a location N-gram in which only the first and last locations match (e.g. US:UK:US), the embodiment of the disclosed system shown in FIG. 4 selects Set of Counters 410 as the corresponding set of counters. And for a location N-gram in which only none of the locations match (e.g. US:UK:IS), the embodiment of the disclosed system shown in FIG. 4 selects Set of Counters 412 as the corresponding set of counters.

Each of the sets of counters 404, 406, 408, 410, and 412 is made up of X counters, where X is the number of values in a set of discrete combined risk score values. Each counter in a given set of counters corresponds to one of the values in the set of discrete combined risk score values.

For each location N-gram, a combined risk score is calculated by combining the individual location risk scores of the locations indicated in the N-gram. An individual location risk score for a given location may, for example, be automatically generated to reflect how uncommon that location is as an originating location for transactions performed by users in a group of users, such as users in the group of users that are enterprise employees with access to enterprise systems provided in Enterprise Computers and Computer Systems 150. For example, an individual location risk score for a location from which no transaction performed by any user in the group has ever originated may be automatically assigned a relatively high individual location risk score. In one embodiment, an individual location risk score for a location may be generated as a value with a range between 0 and 100, and be set to 100 minus a percentage equal to the ratio between i) the number of previous transactions performed by any user in the group that originated from that location, and ii) a total number of transactions previously performed by users in the group. In other words, an individual location risk score for a location may be equal to 100 minus the percentage of all previous transactions performed by users in the group that were originated from that location.

In another example, individual location risk scores may be manually or automatically assigned to individual locations, e.g. by a system administer or security analyst user, such that each individual location risk score indicates an average number of detected cyber attacks originating from each individual location.

The individual location risk scores for the three locations indicated in a location N-gram may be referred to as r1, r2 and r3 as follows:

r1=individual location risk score for the first location in the N-gram r2=individual location risk score for the second location in the N-gram r3=individual location risk score for the third location in the N-gram In one embodiment, the individual location risk scores indicated in each location N-gram are combined to generate a combined risk score for the location N-gram as follows:

Combined risk score=$r1*r2*r3$

In another embodiment, the individual location risk scores indicated in each location N-gram are combined to generate a combined risk score for the location N-gram as follows:

Combined risk score=$\max\{r1,r2,r3\}$

And in another embodiment, the individual location risk scores indicated in each location N-gram are combined to generate a combined risk score for the location N-gram as follows:

Combined risk score=$weight1*\max\{r1,r2,r3\}+weight2*\mathrm{median}\{r2,r3\}+weight3*\min\{r1,r2,r3\}$, where weight1>weight2>weight3

The combined risk score generated for each location N-gram is then converted to a discretized combined risk score for the location N-gram. For example, where the number of values in a set of discrete combined risk score values is 10 (e.g. X=10), the values in the set of discrete combined risk score values may be the integers from 1 to 10, with each integer corresponding to one of the deciles within the range of possible combined risk score values. In such an example, a combined risk score falling within the first decile of possible combined risk score values is converted to a discretized combined risk score of 1, a combined risk score falling within the second decile of possible combined risk score values is converted to a discretized combined risk score of 2, a combined risk score falling within the third decile of possible combined risk score values is converted to a discretized combined risk score of 3, and so on. In such an embodiment, each set of counters is made up often counters numbered from 1 to 10, and the Historical Behavior Data Generator 110 uses the discretized combined risk score for a generated location N-gram to identify the specific counter to be incremented within the set of counters corresponding to that location N-gram.

The discretized combined risk score for a location N-gram identifies the counter that is to be incremented within the corresponding set of counters for that location N-gram. For example, in the case where X=10, and each set of counters contains ten counters numbered 1-10, if the discretized risk score for a location N-gram of US:US:US equals 1, then counter 1 in Set of Counters 404 is identified and incremented by Historical Data Generator 110 for the location N-gram of US:US:US. In another example, for an N-gram in which only the first two locations match, such as US:US:UK, Historical Data Generator 110 uses the discretized combined risk score for the location N-gram to identify the counter within Set of Counters 406 that is to be incremented. In another example, for an N-gram in which only the last two locations match, such as US:UK:UK, Historical Data Generator 110 uses the discretized combined risk score for the location N-gram to identify the counter within Set of Counters 408 that is to be incremented. For an N-gram in which only the first and third locations match, such as US:UK:US, Historical Data Generator 110 uses the discretized combined risk score for the location N-gram to identify the counter within Set of Counters 410 that is to be incremented. And for an N-gram in which none of the locations match, such as US:UK:IS, Historical Data Generator 110 uses the discretized combined risk score for the location N-gram to identify the counter within Set of Counters 412 that is to be incremented.

Similarly, also in an embodiment in which each of the User Behavior Profiles 113 have the format of the User Behavior Profile 400 shown in FIG. 4, Risk Score Generator 120 determines the specific user behavior profile associated with the user that performed Current Transaction 118, and identifies a counter in that user behavior profile that corresponds to Current Location Transaction N-gram 122 using the same steps described above with regard to identifying and incrementing a counter within one of the sets of counters shown in Location N-Gram Counters 402 for one of the Historical Transaction Location N-grams 112, and then determines Current Transaction Risk Score 124 using the value of that counter. For example, in the case where Current Location Transaction N-gram 122 is US:IS:UK, Risk Score Generator 120 generates a combined risk score for US:IS:UK using the individual location risk scores for US, IS and UK, and the converts the combined risk score to a discretized combined risk score and uses the discretized combined risk score to identify a specific counter in Set of Counters 412 from which a value is to be used to determine Current Transaction Risk Score 124.

Using the embodiment shown in FIG. 4, the disclosed technology may be embodied to use only a number of counters equal to five times the number of values in the set of discrete combined risk score values to effectively and efficiently describe location N-grams that are "tri-grams" indicating three locations, e.g. a location from which a historical transaction originated and two locations from which previous transactions were originated by the same user.

Those skilled in the art will recognize that the disclosed techniques may also be applied to even longer series of locations, and also to sets of locations (i.e. unordered groups of unique non-repeating location elements). In this regard, the disclosed techniques also allow complex location-related features which otherwise would be intractable.

Additionally, those skilled in the art will also recognize that while for purposes of explanation the above description includes reference to location N-gram counters contained within user behavior profiles generated based on the historical behavior of individual users, the disclosed techniques are not so limited. Accordingly, the disclosed techniques may similarly be applied to location N-gram counters provided in a user group behavior profile that is generated as described above, but based on the historical behavior of all users within an associated group of users.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of providing risk-based authentication, comprising executing, on at least one processor, the steps of:
   receiving user activity data, the user activity data describing one or more historical transactions;
   in response to receipt of the user activity data, generating historical behavior data by, for each one of the historical transactions described by the user activity data, i) generating a location N-gram that indicates both a location from which the historical transaction originated and at least one location from which originated at least one previous transaction that was performed by a user that performed the historical transaction, ii) identifying a counter corresponding to the location N-gram generated for the historical transaction in a user behavior profile associated with the user that performed the historical transaction, and iii) incrementing the counter corresponding to the location N-gram generated for the historical transaction in the user behavior profile associated with the user that performed the historical transaction;
   detecting a current transaction, wherein the current transaction is a user login request during which a user provided a username and password to access an enterprise system that requires user authentication;
   in response to detecting the current transaction, determining a location from which the current transaction originated, based on an address of the device used to perform the current transaction;
   in response to detecting the current transaction, i) generating a location N-gram for the current transaction that indicates both the location from which the current transaction originated and at least one location from which originated at least one previous transaction performed by the user that performed the current transaction, ii) identifying a counter corresponding to the location N-gram generated for the current transaction in a user behavior profile associated with the user that performed the current transaction, and iii) generating a risk score indicating anomalousness of the current transaction based on a value of the counter corresponding to the location N-gram generated for the current transaction in the user behavior profile associated with the user that performed the current transaction;
   comparing the risk score indicating anomalousness of the current transaction to a risk threshold; and
   triggering an excessive risk response for the current transaction in response to the risk score indicating anomalousness of the current transaction exceeding the risk threshold, wherein the excessive risk response includes denying the current transaction and blocking the user that performed the current transaction from being subsequently authenticated.

2. The computer-implemented method of claim 1, further comprising:
   wherein each location N-gram generated for one of the historical transactions indicates a location from which the historical transaction originated and one location from which a previous transaction that was performed by the user that performed the historical transaction originated;
   wherein each user behavior profile includes a single counter for counting location N-grams in which the location from which the historical transaction originated matches the location from which a previous transaction that was performed by the user that performed the historical transaction originated; and
   wherein generating historical behavior data further includes, for each location N-gram generated for a historical transaction, comparing locations in the location N-gram to each other to determine whether the locations in the location N-gram match, and in response to determining that the locations indicated in the location N-gram match, identifying and incrementing, in the user behavior profile associated with the user that performed the historical transaction, the single counter for counting location N-grams in which the location from which the historical transaction originated matches the location from which a previous transaction that was performed by the user that performed the historical transaction originated.

3. The computer-implemented method of claim 1, further comprising:
   wherein each location N-gram generated for one of the historical transactions indicates the location from which the historical transaction originated and one location from which a previous transaction that was performed by the user that performed the historical transaction originated;
   wherein each user behavior profile includes an individual counter for each unique alphabetically sorted combination of two different location indicators; and
   wherein generating historical behavior data further includes, for each location N-gram generated for one of the historical transactions, alphabetically sorting location indicators contained in the location N-gram before identifying and incrementing the counter corresponding to the location N-gram in the user behavior profile associated with the user that performed the historical transaction.

4. The computer-implemented method of claim 1, wherein each location N-gram generated for one of the historical transactions indicates the location from which the historical transaction originated and two locations from which previous transactions that were performed by the user that performed the historical transaction originated as a first location, a second location, and a third location;
   wherein each user behavior profile includes an individual counter for counting location N-grams which all three locations indicated in the location N-gram match; and
   wherein generating historical behavior data further includes, for each location N-gram generated for one of the historical transactions, comparing locations indicated within the location N-gram to each other to determine which locations indicated in the location N-gram match, and in response to determining that all three locations indicated in the location N-gram match, identifying and incrementing, in the user behavior profile associated with the user that performed the historical transaction, the counter for counting location N-grams in which all three locations indicated in the location N-gram match.

5. The computer-implemented method of claim 4, further comprising:
   wherein each user behavior profile includes an individual counter for counting location N-grams in which only the first location and second location indicated within the location N-gram match; and
   wherein generating historical behavior data further includes, for each location N-gram generated for one of the historical transactions, in response to determining that only the first location and second location indicated within the location N-gram match, identifying and incrementing, in the user behavior profile associated with the user that performed the historical transaction, the counter for counting location N-grams in which only the first location and second location indicated within the location N-gram match.

6. The computer-implemented method of claim 5, further comprising:
wherein each user behavior profile includes an individual counter for counting location N-grams in which only the second location and third location indicated within the location N-gram match; and
wherein generating historical behavior data further includes, for each location N-gram generated for one of the historical transactions, in response to determining that only the second location and third location indicated within the location N-gram match, identifying and incrementing, in the user behavior profile associated with the user that performed the historical transaction, the counter for counting location N-grams in which only the second location and third location indicated within the location N-gram match.

7. The computer-implemented method of claim 6, further comprising:
wherein each user behavior profile includes an individual counter for counting location N-grams in which only the first location and third location indicated within the location N-gram match; and
wherein generating historical behavior data further includes, for each location N-gram generated for each one of the historical transactions, in response to determining that only the first location and third location indicated within the location N-gram match, identifying and incrementing, in the user behavior profile associated with the user that performed the historical transaction, the counter for counting location N-grams in which only the first location and third location indicated within the location N-gram match.

8. The computer-implemented method of claim 7, further comprising:
wherein each user behavior profile includes an individual counter for counting all location N-grams in which none of the locations indicated within the location N-gram match; and
wherein generating historical behavior data further includes, for each location N-gram generated for one of the historical transactions, in response to determining that none of the locations indicated within the location N-gram match, identifying and incrementing, in the user behavior profile associated with the user that performed the historical transaction, the counter for counting all location N-grams in which none of the locations indicated within the location N-gram match.

9. The computer-implemented method of claim 1, wherein each location N-gram generated for one of the historical transactions indicates the location from which the historical transaction originated and two locations from which previous transactions that were performed by the user that performed the historical transaction originated as a first location, a second location, and a third location;
wherein each user behavior profile includes i) a first set of counters for counting location N-grams in which all three locations indicated in the location N-gram match, each counter in the first set of counters corresponding to one of a set of discrete combined risk score values, ii) a second set of counters for counting location N-grams in which only the first location and second location indicated within the location N-gram match, each counter in the second set of counters corresponding to one of the set of discrete combined risk score values, iii) a third set of counters for counting location N-grams in which only the second location and third location indicated within the location N-gram match, each counter in the third set of counters corresponding to one of the set of discrete combined risk score values, iv) a fourth set of counters for counting location N-grams in which only the first location and third location indicated within the location N-gram match, each counter in the fourth set of counters corresponding to one of the set of discrete combined risk score values, and v) a fifth set of counters for counting location N-grams in which none of the locations indicated within the location N-gram match, each counter in the fifth set of counters corresponding to one of the set of discrete combined risk score values; and
wherein generating historical behavior data further includes, for each location N-gram generated for each one of the historical transactions, identifying and incrementing the counter corresponding to the location N-gram generated for the historical transaction by i) selecting a set of counters corresponding to the location N-gram based on which locations indicated in the location N-gram match, ii) calculating a combined risk score for the location N-gram by combining an individual location risk score for the first location, an individual location risk score for the second location, and an individual location risk score for the third location, iii) converting the combined risk score to a discretized combined risk score by mapping the combined risk score to one of the set of discrete combined risk score values, and iv) incrementing a counter in the set of counters corresponding to the location N-gram that corresponds to one of the set of discrete combined risk score values that matches the discretized combined risk score.

10. A system for providing risk-based authentication, comprising:
processing circuitry; and
memory communicably coupled to the processing circuitry, the memory storing program code for providing risk-based authentication, wherein the program code, when executed by the processing circuitry, causes the processing circuitry to:
receive user activity data, the user activity data describing one or more historical transactions,
in response to receipt of the user activity data, generate historical behavior data by, for each one of the historical transactions described by the user activity data, i) generating a location N-gram that indicates both a location from which the historical transaction originated and at least one location from which originated at least one previous transaction that was performed by a user that performed the historical transaction, ii) identifying a counter corresponding to the location N-gram generated for the historical transaction in a user behavior profile stored in the memory and associated with the user that performed the historical transaction, and iii) incrementing the counter corresponding to the location N-gram generated for the historical transaction in the user behavior profile associated with the user that performed the historical transaction, detect a current transaction, wherein the current transaction is a user login request during which a user provided a username and password to access an enterprise system that requires user authentication, in response to detecting the current transaction, determine a location from which the current transaction originated, based on an address of the device used to perform the current transaction;

in response to detecting the current transaction, i) generate a location N-gram for the current transaction that indicates both the location from which the current transaction originated and at least one location from which originated at least one previous transaction performed by the user that performed the current transaction, ii) identify a counter corresponding to the location N-gram generated for the current transaction in a user behavior profile stored in the memory and associated with the user that performed the current transaction, and iii) generate a risk score indicating anomalousness of the current transaction based on a value of the counter corresponding to the location N-gram generated for the current transaction in the user behavior profile associated with the user that performed the current transaction, compare the risk score indicating anomalousness of the current transaction to a risk threshold, and trigger an excessive risk response for the current transaction in response to the risk score indicating anomalousness of the current transaction exceeding the risk threshold, wherein the excessive risk response includes denying the current transaction and blocking the user that performed the current transaction from being subsequently authenticated.

11. The system of claim 10, further comprising:

wherein each location N-gram generated for one of the historical transactions indicates a location from which the historical transaction originated and one location from which a previous transaction that was performed by the user that performed the historical transaction originated;

wherein each user behavior profile includes a single counter for counting location N-grams in which the location from which the historical transaction originated matches the location from which a previous transaction that was performed by the user that performed the historical transaction originated; and wherein the program code, when executed by the processing circuitry, further causes the processing circuitry to generate historical behavior data by, for each location N-gram generated for a historical transaction, comparing locations in the location N-gram to each other to determine whether the locations in the location N-gram match, and in response to determining that the locations indicated in the location N-gram match, identifying and incrementing, in the user behavior profile associated with the user that performed the historical transaction, the single counter for counting location N-grams in which the location from which the historical transaction originated matches the location from which a previous transaction that was performed by the user that performed the historical transaction originated.

12. The system of claim 10, further comprising:

wherein each location N-gram generated for one of the historical transactions indicates the location from which the historical transaction originated and one location from which a previous transaction that was performed by the user that performed the historical transaction originated;

wherein each user behavior profile includes an individual counter for each unique alphabetically sorted combination of two different location indicators; and wherein the program code, when executed by the processing circuitry, further causes the processing circuitry to generate historical behavior data by, for each location N-gram generated for one of the historical transactions, alphabetically sorting location indicators contained in the location N-gram before identifying and incrementing the counter corresponding to the location N-gram in the user behavior profile associated with the user that performed the historical transaction.

13. The system of claim 10, wherein each location N-gram generated for one of the historical transactions indicates the location from which the historical transaction originated and two locations from which previous transactions that were performed by the user that performed the historical transaction originated as a first location, a second location, and a third location;

wherein each user behavior profile includes an individual counter for counting location N-grams which all three locations indicated in the location N-gram match; and wherein the program code, when executed by the processing circuitry, further causes the processing circuitry to generate historical behavior data by, for each location N-gram generated for one of the historical transactions, comparing locations indicated within the location N-gram to each other to determine which locations indicated in the location N-gram match, and in response to determining that all three locations indicated in the location N-gram match, identifying and incrementing, in the user behavior profile associated with the user that performed the historical transaction, the counter for counting location N-grams in which all three locations indicated in the location N-gram match.

14. The system of claim 13, further comprising:

wherein each user behavior profile includes an individual counter for counting location N-grams in which only the first location and second location indicated within the location N-gram match; and wherein the program code, when executed by the processing circuitry, further causes the processing circuitry to generate historical behavior data by, for each location N-gram generated for one of the historical transactions, in response to determining that only the first location and second location indicated within the location N-gram match, identifying and incrementing, in the user behavior profile associated with the user that performed the historical transaction, the counter for counting location N-grams in which only the first location and second location indicated within the location N-gram match.

15. The system of claim 14, further comprising:

wherein each user behavior profile includes an individual counter for counting location N-grams in which only the second location and third location indicated within the location N-gram match; and wherein the program code, when executed by the processing circuitry, further causes the processing circuitry to generate historical behavior data by, for each location N-gram generated for one of the historical transactions, in response to determining that only the second location and third location indicated within the location N-gram match, identifying and incrementing, in the user behavior profile associated with the user that performed the historical transaction, the counter for counting location N-grams in which only the second location and third location indicated within the location N-gram match.

16. The system of claim 15, further comprising:
wherein each user behavior profile includes an individual counter for counting location N-grams in which only the first location and third location indicated within the location N-gram match; and
wherein the program code, when executed by the processing circuitry, further causes the processing circuitry to generate historical behavior data by, for each location N-gram generated for each one of the historical transactions, in response to determining that only the first location and third location indicated within the location N-gram match, identifying and incrementing, in the user behavior profile associated with the user that performed the historical transaction, the counter for counting location N-grams in which only the first location and third location indicated within the location N-gram match.

17. The system of claim 16, further comprising:
wherein each user behavior profile includes an individual counter for counting all location N-grams in which none of the locations indicated within the location N-gram match; and
wherein the program code, when executed by the processing circuitry, further causes the processing circuitry to generate historical behavior data further by, for each location N-gram generated for one of the historical transactions, in response to determining that none of the locations indicated within the location N-gram match, identifying and incrementing, in the user behavior profile associated with the user that performed the historical transaction, the counter for counting all location N-grams in which none of the locations indicated within the location N-gram match.

18. The system of claim 10, wherein each location N-gram generated for one of the historical transactions indicates the location from which the historical transaction originated and two locations from which previous transactions that were performed by the user that performed the historical transaction originated as a first location, a second location, and a third location;
wherein each user behavior profile includes i) a first set of counters for counting location N-grams in which all three locations indicated in the location N-gram match, each counter in the first set of counters corresponding to one of a set of discrete combined risk score values, ii) a second set of counters for counting location N-grams in which only the first location and second location indicated within the location N-gram match, each counter in the second set of counters corresponding to one of the set of discrete combined risk score values, iii) a third set of counters for counting location N-grams in which only the second location and third location indicated within the location N-gram match, each counter in the third set of counters corresponding to one of the set of discrete combined risk score values, iv) a fourth set of counters for counting location N-grams in which only the first location and third location indicated within the location N-gram match, each counter in the fourth set of counters corresponding to one of the set of discrete combined risk score values, and v) a fifth set of counters for counting location N-grams in which none of the locations indicated within the location N-gram match, each counter in the fifth set of counters corresponding to one of the set of discrete combined risk score values; and
wherein the program code, when executed by the processing circuitry, further causes the processing circuitry to generate historical behavior data further by, for each location N-gram generated for each one of the historical transactions, identifying and incrementing the counter corresponding to the location N-gram generated for the historical transaction by i) selecting a set of counters corresponding to the location N-gram based on which locations indicated in the location N-gram match, ii) calculating a combined risk score for the location N-gram by combining an individual location risk score for the first location, an individual location risk score for the second location, and an individual location risk score for the third location, iii) converting the combined risk score to a discretized combined risk score by mapping the combined risk score to one of the set of discrete combined risk score values, and iv) incrementing a counter in the set of counters corresponding to the location N-gram that corresponds to one of the set of discrete combined risk score values that matches the discretized combined risk score.

19. A computer program product including a non-transitory computer readable medium which stores program code operable to provide risk-based authentication, the program code comprising:
program code for receiving user activity data, the user activity data describing one or more historical transactions;
program code for, in response to receipt of the user activity data, generating historical behavior data by, for each one of the historical transactions described by the user activity data, i) generating a location N-gram that indicates both a location from which the historical transaction originated and at least one location from which originated at least one previous transaction that was performed by a user that performed the historical transaction, ii) identifying a counter corresponding to the location N-gram generated for the historical transaction in a user behavior profile associated with the user that performed the historical transaction, and iii) incrementing the counter corresponding to the location N-gram generated for the historical transaction in the user behavior profile associated with the user that performed the historical transaction;
program code for detecting a current transaction, wherein the current transaction is a user login request during which a user provided a username and password to access an enterprise system that requires user authentication;
program code for, in response to detecting the current transaction, determining a location from which the current transaction originated, based on an address of the device used to perform the current transaction;
program code for, in response to detecting the current transaction, i) generating a location N-gram for the current transaction that indicates both the location from which the current transaction originated and at least one location from which originated at least one previous transaction performed by the user that performed the current transaction, ii) identifying a counter corresponding to the location N-gram generated for the current transaction in a user behavior profile associated with the user that performed the current transaction, and iii) generating a risk score indicating anomalousness of the current transaction based on a value of the counter corresponding to the location N-gram generated for the current transaction in the user behavior profile associated with the user that performed the current transaction;

program code for comparing the risk score indicating anomalousness of the current transaction to a risk threshold; and program code for triggering an excessive risk response for the current transaction in response to the risk score indicating anomalousness of the current transaction exceeding the risk threshold, wherein the excessive risk response includes denying the current transaction and blocking the user that performed the current transaction from being subsequently authenticated.

20. The method of claim 1, further comprising:

detecting a second transaction that requests access to the enterprise system that requires user authentication;

in response to detecting the second transaction, i) generating a location N-gram for the second transaction that indicates both a location from which the second transaction originated and at least one location from which originated at least one previous transaction performed by a user that performed the second transaction, ii) identifying a counter corresponding to the location N-gram generated for the second transaction in a user behavior profile associated with the user that performed the second transaction, and iii) generating a second risk score, the second risk score indicating anomalousness of the second transaction based on a value of the counter corresponding to the location N-gram generated for the second transaction in the user behavior profile associated with the user that performed the second transaction;

comparing the second risk score to the risk threshold; and triggering, for the second transaction, a second excessive risk response in response to the second risk score exceeding the risk threshold, wherein the second excessive risk response includes i) allowing the user that performed the second transaction to be authenticated, ii) collecting information during a subsequent time period by monitoring the online activities of the user that performed the second transaction during the subsequent time period, and iii) transmitting the information collected during the subsequent time period to a remote security analyst computer system for review by a security analyst.

* * * * *